United States Patent Office 3,257,383
Patented June 21, 1966

3,257,383
16-CARBAMYL PREGNANE DERIVATIVES
Pierre Crabbé, Mexico City, Mexico, assignor to Syntex Corporation, Panama, Panama, a corporation of Panama
No Drawing. Filed Sept. 5, 1962, Ser. No. 221,432
20 Claims. (Cl. 260—239.5)

This application is a continuation-in-part of my copending application Serial No. 123,673 filed July 13, 1961, now abandoned.

The present invention relates to novel cyclopentanophenanthrene compounds and to a process for the production thereof.

More particularly, the present invention relates to novel 16β-carbamyl-17α-pregnane, 16β-carbamyl-17β-pregnane, 16α-carbamyl-17αpregnane and 16αcarbamyl-17β-pregnane derivatives.

The novel compounds of the present invention which are progestational type agents with a high anti-ovulatory activity and are also anti-estrogenic and anti-androgenic agents are represented by the following formulas:

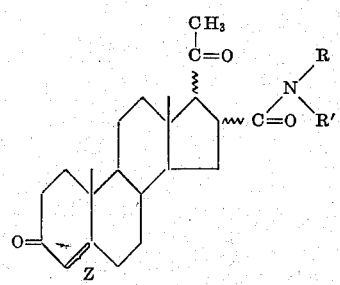

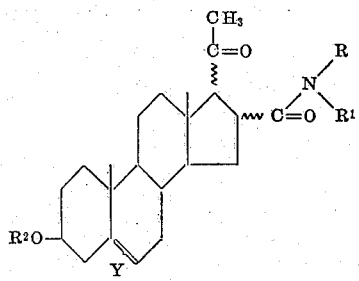

In the above formulas Z represents a double bond or a saturated linkage between C–4 and C–5; Y represents a double bond or a saturated linkage between C–5 and C–6; R and $R^1$ each represent hydrogen, a lower alkyl, amino lower alkyl, lower alkylamino lower alkyl, diloweralkylamino lower alkyl, aryl or aralkyl group of up to 8 carbon atoms; R and $R^1$ together with the nitrogen represent a heterocycle such as piperidine, morpholine, piperazine or pyrrolidine which may or may not contain alkyl substituents; $R^2$ represents hydrogen or a hydrocarbon carboxylic acyl group containing less than 12 carbon atoms. The wavy line between C–17 and C–20 indicates the α and β configuration for the acetyl side chain and the wavy line at C–16 indicates the α and β steric configuration for the carbamyl moiety.

The acyl group is derived from hydrocarbon carboxylic acids containing less than 12 carbon atoms which may be saturated or unsaturated, of straight, branched, cyclic or cyclic-aliphatic, chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethyl-

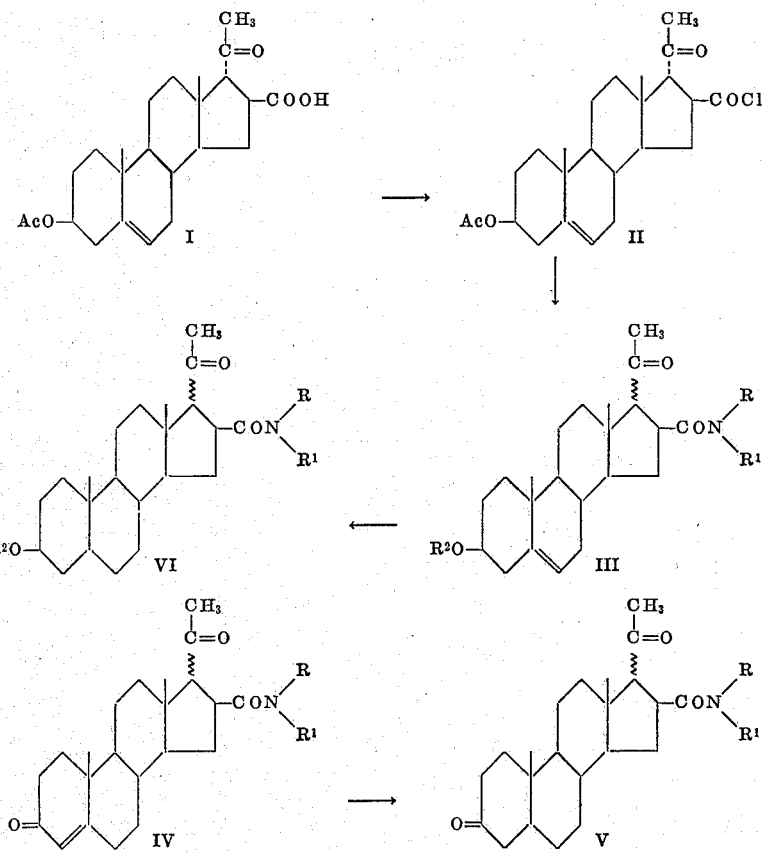

acetate, t-butylacetate, phenoxyacetate, cyclopentylpropionate, aminoacetate and β-chloropropionate.

The novel 16β-carbamyl compounds of the present invention are prepared by the process illustrated by the above equation:

In the above formulas R, $R^1$ and $R^2$ have the same meaning as hereinbefore set forth; Ac represents the acetyl radical.

In practicing the process outlined above, the starting compound is $\Delta^5$-17α-pregnen-3β-ol-20-one-16β-carboxylic acid (Romo, Tetrahedron 3, 37, 1958). The process of Romo is correct but the configuration assigned by this author (C–16α, C–17β), is different. The configuration (C–16β, C–17α) assigned later by Mazur et al. (Tetrahedron 7, 130, 1959) for this acid is the correct configuration. This acid is conventionally acetylated to give the $\Delta^5$-17α-pregnen-3β-ol-20-one-16β-carboxylic acid 3-acetate (I) which is treated with a suitable halogenating agent, such as thionyl chloride to give the corresponding acid chloride (II) which upon reaction at room temperature and during 18 to 60 hours with ammonia or an amine, such as methylamine, diethylamine, morpholine, or a lower alkylene diamine, gives the corresponding 16β-(amino)-carbonyl-$\Delta^5$-17α-pregnen-3β-ol-20-one 3-acetate derivative (III: $R^2$=aceyl). In order to obtain the 16β-(amino)-carbonyl-$\Delta_5$-17β-pregnen-3β-ol-20-one 3-acetate, an excess of reagent is used, and the reaction time is extended to 8 days. The 17β-isomer may also be obtained by a long alkaline treatment, such as for example, by treatment of the 17α-compound with potassium hydroxide in methanol solution, for a period of time in the order of 2 days.

Upon partial saponification of the 3-acetate derivatives in a mild alkaline medium, such as potassium carbonate solution, there are obtained the corresponding free 3β-hydroxyl compounds (III: $R^2$=hydrogen).

The 16β-(amino)-carbonyl-$\Delta^4$-17α-pregnene-3,20-dione derivative (IV) as well as the 17β-isomer are prepared by reaction of the known 16β-carboxy 17-isoprogesterone (Romo, Tetrahedron 3, 37, 1958) with oxalyl chloride followed by a reaction with ammonia or an amine, such as methylamine, diethylamine, morpholine or a lower alkylene diamine. This derivative is hydrogenated to the respective 16β-(amino)-carbonyl-17α-allopregnane-3,20-dione derivative (V).

Upon hydrogenation of the 16β-(amino)-carbonyl-$\Delta^5$-17α-pregnen-3β-ol-20-one, and its 17β-isomer (III: $R^2$=hydrogen), there are produced the 16β-(amino)-carbonyl-17α-allopregnan-3β-ol-20-one derivative and the corresponding 17β-isomers (VI: $R^2$=hydrogen).

The above obtained compounds with a secondary hydroxyl group are conventionally acylated in pyridine with an acylating agent, as for example acetic anhydride, propionic anhydride or benzoyl chloride, to give the corresponding 3β-acyloxy derivatives (III and VI: $R^2$=acyl).

The novel 16α-carbamyl-17β-pregnane derivatives of the present invention are prepared in accordance with the following scheme:

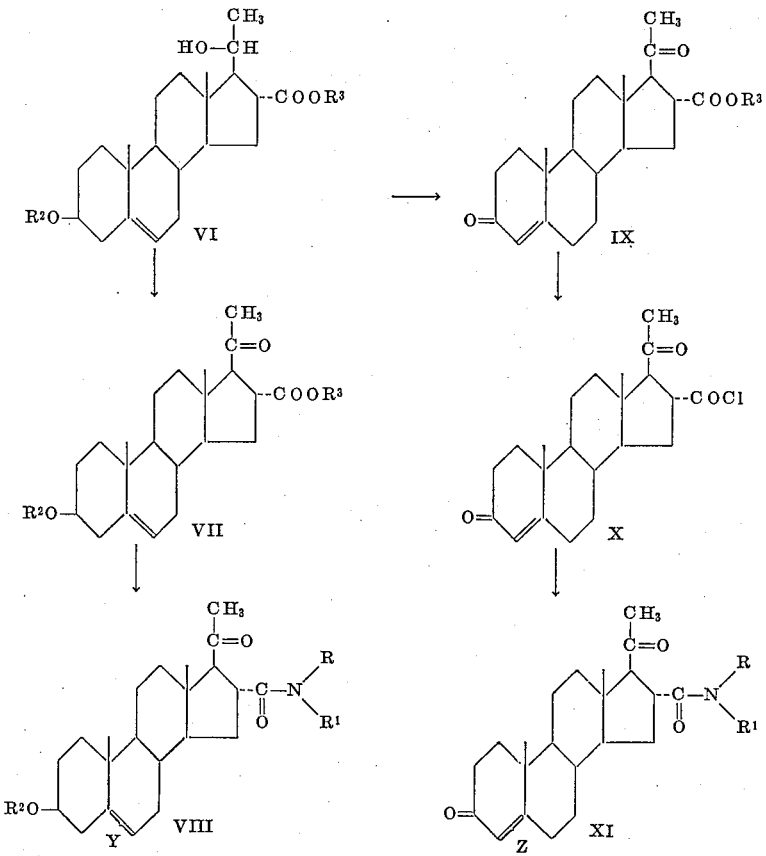

In the above formulae R, $R^1$ and $R^2$ have the same meaning as hereinbefore set forth; $R^3$ may be hydrogen or lower alkyl.

In practicing the process outlined above, the starting $\Delta^5$-pregnene-3β-20β-diol-16α-carboxylic acid (VI: $R^2=R^3$=H) is treated with diazomethane in a solvent inert to the reagent, such as methylene chloride-ether, for a period of time of the order of 18 hours, thus giving $\Delta^5$-pregnene-3β,20β-diol-16α-carboxylic acid methyl ester (VI: $R^2$=H, $R^3$=methyl), which upon selective acetylation with approximately 1 molar equivalent of acetic anhydride in pyridine at about 0° C., yields $\Delta^5$-pregnene-3β,20β-diol-16α-carboxylic acid methyl ester 3-acetate (VI: $R^2$=acetyl; $R^3$=methyl). Conventional Oppenauer oxidation of the latter steroid affords $\Delta^5$-pregnen-3β-ol-20-one-16α-carboxylic acid methyl ester acetate (VII: $R^2$=acetyl; $R^3$=methyl), which is hydrolyzed conventionally in a basic medium to give $\Delta^5$-pregnen-3β-ol-20-one-16α-carboxylic acid (VII: $R^2=R^3$=H). Conventional acylation of the latter, as by treatment with acetic anhydride in pyridine, yields the corresponding $\Delta^5$-pregnen-3β-ol-20-one-16α-carboxylic acid acylate (VII: $R^2$=acyl; $R^3$=H), which is treated with oxalyl chloride, under anhydrous conditions, preferably at reflux temperature for a period of time of the order of 2 hours, thus furnishing the corresponding acylate of $\Delta^5$-pregnen-3β-ol-20-one-16α-carboxylic acyl chloride, which upon reaction, at room temperature and during 1 to 60 hours, with ammonia or an amine, such as methylamine, diethylamine, morpholine, or a lower alkylene diamine gives the corresponding 16α - (amino)carbonyl-$\Delta^5$-pregnen-3β-ol-20-one 3-acylate (VIII: $R^2$=acyl; Y=double bond). The last named acylate is conventionally saponified in a mild alkaline medium, as for example potassium carbonate in methanol to give the corresponding free 3-alcohol (VIII: $R^2$=H; Y=double bond). The 16α-(amino)carbonyl-$\Delta^5$-pregnen-3β-ol-20-one derivatives of the present invention (III: Y=double bond) upon hydrogenation in the presence of a suitable catalyst, as for example 5% palladium on charcoal, yield the corresponding 16α-(amino)carbonyl-allopregnane-3,20-dione (VIII: Y=saturated linkage).

Following a second sequence of reactions, $\Delta^5$-pregnene-3β,20β-diol-16α-carboxylic acid methyl ester (VI: $R^2$=H; $R^3$=methyl) is treated under conventional Oppenauer conditions to give $\Delta^4$-pregnene-3,20-dione-16α-carboxylic acid methyl ester (IX: $R^3$=methyl) which is conventionally hydrolyzed in a basic medium to the free acid (IX: $R^3$=H). Treatment of the latter acid with a sodium hydroxide solution, followed by reaction of the resulting sodium salt with oxalyl chloride gives the corresponding acyl chloride (X), which upon reaction with ammonia or an amine, such as methylamine, diethylamine, morpholine or a lower alkylene diamine gives the corresponding 16α-(amino)carbonyl-$\Delta^4$-pregnene-3,20-dione (XI: Z=double bond). The latter $\Delta^4$-pregnene-3,20-dione derivative is hydrogenated in the presence of a suitable catalyst, such as 5% palladium on charcoal, to produce the corresponding 16α - (amino)carbonyl-allopregnane-3,20-dione (XI: Z=saturated linkage).

The novel 16α-carbamyl-17α-pregnane derivatives of the present invention are prepared in accordance with the process illustrated as follows:

In the above formulas R, $R^1$, $R^2$ and $R^3$ have the same meaning as specified hereinbefore.

In practicing the process just outlined, the starting 16β-carboxy-$\Delta^5$-17α-pregnen-3β-ol-20-one (XII) is treated with acetic anhydride in pyridine, at steam bath temperature, for a period of time of the order of 5 hours, thus yielding $\Delta^{5,20}$-17α-pregnadiene-3β,20-diol-16α-carboxylic acid lactone (XIII), which upon hydrolysis in a very mild alkaline medium such as potassium bicarbonate in water-dioxane, at reflux temperature for a period of time of the order of 2 hours affords the acetate of $\Delta^5$-17α-pregnene-3β-ol-20-one-16α-carboxylic acid (XIV: $R^2$=acetyl; $R^3$=H). Treatment of the latter acid with oxalyl chloride under anhydrous conditions, preferably at reflux temperature for a period of time of the order of 2 hours, yields the corresponding 16α-carboxylic acyl chloride which is treated with ammonia or an amine, such as methylamine, diethylamine, morpholine, or a lower alkylene dioamine, preferably at room temperature and during 1 to 60 hours, thus giving the corresponding 16α-(amino)-carbonyl-$\Delta^5$-17α-pregnen-3β-ol-20-one 3-acylate (XV: $R^2$=acyl; Y=double bond). The latter acylate may be conventionally saponified in a mild alkaline medium to give the corresponding free 3-alcohol (XV: $R^2$=H; Y=double bond). The 16α-(amino)-carbonyl-$\Delta^5$-17α-pregnen-3β-ol-20-one derivatives described heretofore (XV: Y=double bond) are treated in a hydrogen atmosphere, in the presence of a suitable catalyst, such as 5% palladium on charcoal, to give the corresponding 16α-(amino)-carbonyl-17α-allopregnan-3β-ol-20-one derivatives (XV: Y=saturated linkage).

Following a second sequence of reactions, the acetate of $\Delta^5$-17α-pregnen-3β-ol-20-one-16α-carboxylic acid (XIV: $R^2$=acetyl; $R^3$=H) is hydrolyzed in a basic medium, such as potassium carbonate in water, to give the free 3-alcohol (XIV: $R^2$=$R^3$=H) which upon conventional treatment with diazomethane yields $\Delta^5$-17α-pregnen-3β-ol-20-one-16α-carboxylic acid methyl ester (XIV: $R^2$=H; $R^3$=methyl). The latter $\Delta^5$-17α-pregnen-3β-ol is conventionally treated under Oppenauer conditions to pro-

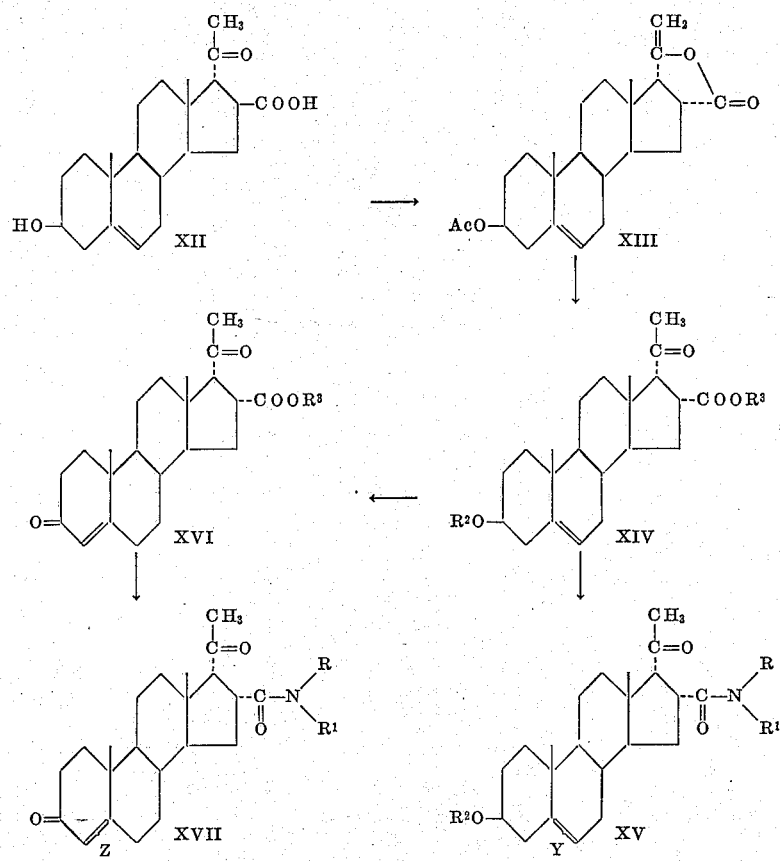

duce Δ⁴-17α-pregnene-3,20-dione-16α-carboxylic acid methyl ester (XVI: R³=methyl) which upon treatment in a basic medium, such as sodium carbonate in water, furnishes the corresponding free acid (XVI: R³=H). Treatment of the latter acid with a sodium hydroxide solution, followed by reaction of the resulting salt with oxalyl chloride, gives the corresponding acyl chloride which upon reaction with ammonia or an amine, such as methylamine, diethylamine, morpholine or a lower alkylene diamine, gives the corresponding (16α-amino)-carbonyl-Δ⁴-17α-pregnene-3,20-dione (XVII: Z=double bond). The latter Δ⁴-17α-pregnene-3,20-dione derivative is hydrogenated in the presence of a suitable catalyst, such as 5% palladium on charcoal, to produce the corresponding 16α-(amino)-carbonyl-17α-allopregnane - 3,20 - dione (XVII: Z=saturated linkage).

The following specific examples serve to illustrate but are not intended to limit the scope of the present invention:

EXAMPLE I

To a solution of 3 g. of Δ⁵-pregnene-3β,20β-diol-16α-carboxylic acid (Mazur et al. Tetrahedron 7, 130 (1959)) in 50 cc. of methylene chloride were added an excess of diazomethane in ether (obtained from nitroso methylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded Δ⁵-pregnene-3β,20β-diol-16α-carboxylic acid methyl ester.

EXAMPLE II

A solution of 1 g. of the latter ester in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded Δ⁴-pregene-3,20-dione-16α-carboxylic acid methyl ester.

EXAMPLE III

A mixture of 1 g. of Δ⁵-pregnene-3β,20β-diol-16α-carboxylic acid methyl ester, 4 cc. of pyridine and 1.05 molar equivalents of acetic anhydride was kept at 0° C. overnight, poured into ice water, the formed precipitate was filtered, washed with water and dried. Crystallization from acetone-hexane gave Δ⁵-pregnene-3β,20β-diol-16α-carboxylic acid methyl ester 3-acetate.

EXAMPLE IV

The latter compound was treated in accordance with Example II thus giving Δ⁵-pregnen-3β-ol-20-one-16α-carboxylic acid methyl ester acetate.

EXAMPLE V

A suspension of 1 g. of the latter steroid in 60 cc. of methanol was treated with a solution of 1 g. of potassium carbonate in 6 cc. of water; the mixture was boiled under reflux for 1 hour, then acidified with dilute hydrochloric acid and extracted with methylene chloride. The extract was washed with water, dried over anhydrous sodium sulfate and evaporated to dryness thus giving Δ⁵-pregnen-3β-ol-20-one-16α-carboxylic acid.

When applying the same procedure to Δ⁴-pregnene-3,20-dione-16α-carboxylic acid methyl ester, there was produced the free Δ⁴-pregnene-3,20-dione-16α-carboxylic acid.

EXAMPLE VI

Δ⁵-pregnene - 3β - ol - 20 - one-16α-carboxylic acid was treated in accordance with Example III, thus yielding Δ⁵-pregnen-3β-ol-20-one-16α-carboxylic acid acetate.

EXAMPLE VII 1 g. of Δ⁵-pregnen-3β-ol-20-one-16α-carboxylic acid acetate and 5 cc. of oxalyl chloride was refluxed under anhydrous conditions during 2 hours. The solution was evaporated in vacuum, 10 cc. of dry benzene were added and reevaporated to eliminate traces of oxalyl chloride, thus affording the acetate of Δ⁵-pregnen-3β-ol-20-one-16α-carboxylic acyl chloride. The latter crude acyl chloride was treated with 2 cc. of diethylamine in 50 cc. of benzene. The reaction mixture was left overnight at room temperature, then an aqueous solution of sodium carbonate was added. The resulting emulsion was extracted with ether, the extract dried over sodium sulfate and evaporated to dryness. Crystallization from methanol-water afforded 16α-(diethylcarbamyl)-Δ⁵-pregnen-3β-ol-20-one acetate.

EXAMPLE VIII 1 g. of Δ⁵-pregnen-3β-ol-20-one-16α-carboxylic acid acetate was treated following the technique described in Example VII except that diethylamine was substituted by piperidine thus affording 16α-(piperidino-carbonyl)-Δ⁵-pregnen-3β-ol-20-one acetate.

EXAMPLE IX 1 g. of Δ⁵-pregnen-3β-ol-20-one-16α-carboxylic acid acetate was treated in accordance with the method described in Example VII, except that diethylamine was substituted by morpholine thus furnishing 16α-(morpholinocarbonyl)-Δ⁵-pregnen-3β-ol-20-one acetate.

EXAMPLE X 1 g. of Δ⁵-pregnen-3β-ol-20-one-16α-carboxylic acid acetate was treated with oxalyl chloride in accordance with Example VII. The 16α-carboxylic acid chloride thus obtained was dissolved in 50 cc. of benzene and 5 cc. of ammonium hydroxide were added. The reaction mixture was kept at room temperature for 1 hour. The formed precipitate was filtered off, washed with benzene and dried under vacuum. Recrystallization from methanol-water afforded 16α-carbamyl-Δ⁵-pregnen-3β-ol-20-one acetate.

EXAMPLE XI 1 g. of the acetate of Δ⁵-pregnen-3β-ol-20-one-16α-carboxylic acyl chloride, obtained according to Example VII, was dissolved in 50 cc. of benzene and treated with 5 cc. of N′,N′-diethyl-aminoethylamine and the reaction mixture was left for 60 hours at room temperature. The product was isolated following the usual procedure, thus giving 16α-(N′,N′-diethylamine-ethyl-carbamyl)-Δ⁵-pregnen-3β-ol-20-one acetate.

EXAMPLE XII 1 g. of Δ⁵-pregnen-3β-ol-20-one-16α-carboxylic acid acetate was treated in accordance with the method described in Example VII, except that diethylamine was substituted by N-methyl aniline thus yielding 16α-(N-methyl-N-phenyl-carbamyl)-Δ⁵-pregnen-3β-ol-20-one acetate.

EXAMPLE XIII 3 g. of 16α-carbamyl-Δ⁵-pregnen-3β-ol-20-one acetate in 100 cc. of methanol were treated with 1 g. of potassium carbonate in 5 cc. of water. The mixture was refluxed for 0.5 hours, then poured into ice water, the precipitate collected, washed with water, and dried, thus producing a crude product which upon recrystallization from methylene chloride-ether afforded 16α-carbamyl-Δ⁵-pregnen-3β-ol-20-one.

When applying the above method to:

16α-(diethyl carbamyl)-Δ⁵-pregnen-3β-ol-20-one acetate,
16α-(piperidino carbonyl)-Δ⁵-pregnen-3β-ol-20-one acetate,
16α-(morpholino carbonyl)-Δ⁵-pregnen-3β-ol-20-one acetate,
16α-(N',N'-diethylamino ethyl carbamyl)-Δ⁵-pregnen-3β-ol-20-one acetate, and
16α-(N-methyl-N-phenyl carbamyl)-Δ⁵-pregnen-3β-ol-20-one acetate there were respectively obtained:
16α-(diethyl carbamyl)-Δ⁵-pregnen-3β-ol-20-one,
16α-(piperidino carbonyl)-Δ⁵-pregnen-3β-ol-20-one,
16α-(morpholino carbonyl)-Δ⁵-pregnen-3β-ol-20-one,
16α-(N',N'-diethylamino-ethyl-carbamyl)-Δ⁵-pregnen-3β-ol-20-one, and
16α-(N-methyl-N-phenyl carbamyl)-Δ⁵-pregnen-3β-ol-20-one.

EXAMPLE XIV

To a solution of 2.4 g. of Δ⁴-pregnene-3,20-dione-16α-carboxylic acid in 360 cc. of ethyl alcohol, 67.5 cc. of 0.1 N sodium hydroxide solution were added. This mixture was evaporated to dryness under high vacuum and then dried, under high vacuum, at 110° during 1 hour. Then 50 cc. of anhydrous benzene and 25 drops of anhydrous pyridine were added, at room temperature. After cooling this solution at 0°, 10 cc. of oxalyl chloride were added with stirring. The mixture was allowed to react during 3 hours at 0°. The solvents were then evacuated under high vacuum. To this dry material 60 cc. of anhydrous benzene were added and then, drop by drop, at 0°, 80 cc. of ammonium hydroxide were added with stirring. This mixture was allowed to react for 3 hours at 0° and 15 hours at room temperature. Extraction with ethyl acetate followed by a chromatography on silica gel yielded a product which was recrystallized from methanol-water to give 16α-carbamyl-Δ⁴-pregnene-3,20-dione.

The foregoing procedure was repeated, except that ammonium hydroxide was substituted by diethylamine, piperidine, morpholine, N',N'-diethylaminoethylamine, and N-methyl aniline, thus affording respectively 16α-(diethyl carbamyl)-Δ⁴-pregnene-3,20-dione, 16α-(piperidino carbonyl)-Δ⁴-pregnene-3,20-dione, 16α-(morpholino-carbonyl) - Δ⁴-pregnene-3,20-dione, 16α-(N',N'-diethylaminoethyl-carbamyl)-Δ⁴-pregnene-3,20-dione, and 16α-(N-methyl-N-phenyl carbamyl)-Δ⁴-pregnene-3,20-dione.

EXAMPLE XV

A solution of 1 g. of 16α-carbamyl-Δ⁴-pregnene-3,20-dione in 50 cc. of ethyl acetate was shaken with 50 mg. of 5% palladium-on-charcoal catalyst in a hydrogen atmosphere, until the gas uptake corresponded to one mol. The catalyst was filtered off and the filtrate evaporated to dryness. Recrystallization from methanol afforded 16α-carbamyl-allopregnane-3,20-dione.

The rest of the products obtained in Example XIV were treated by the same procedure, thus yielding respectively: 16α-(diethyl carbamyl)-allopregnane-3,20-dione, 16α-(piperidino carbonyl)-allopregnane-3,20-dione, 16α-(morpholino carbonyl)-allopregnane-3,20-dione, 16α-(N',N'-diethylaminoethyl carbamyl) - allopregnane-3,20-dione, and 16α-(N-methyl-N-phenyl carbamyl)-allopregnane-3,20-dione.

EXAMPLE XVI

The procedure described in Example XV was applied to:

16α-carbamyl-Δ⁵-pregnen-3β-ol-20-one,
16α-(diethyl carbamyl)-Δ⁵-pregnen-3β-ol-20-one,
16α-(piperidino carbonyl)-Δ⁵-pregnen-3β-ol-20-one,
16α-(morpholino carbonyl)-Δ⁵-pregnen-3β-ol-20-one,
16α-(N',N'-diethylaminoethyl carbamyl)-Δ⁵-pregnen-3β-ol-20-one, and
16α-(N-methyl-N-phenyl carbamyl)-Δ⁵-pregnen-3β-ol-20-one, thus yielding respectively:
16α-carbamyl-allopregnan-3β-ol-20-one,
16α-(diethyl carbamyl)-allopregnan-3β-ol-20-one,
16α-(piperidino carbonyl)-allopregnan-3β-ol-20-one,
16α-(morpholino carbonyl)-allopregnan-3β-ol-20-one,
16α-(N',N'-diethylaminoethyl carbamyl)-allopregnan-3β-ol-20-one, and
16α-(N-methyl-N-phenyl carbamyl)-allopregnan-3β-ol-20-one.

EXAMPLE XVII 1 g. of 16α-carbamyl-Δ⁵-pregnen-3β-ol-20-one, in 5 cc. of pyridine was treated with 1 cc. of propionic anhydride. The reaction mixture was left overnight at room temperature, then poured into ice water, the formed precipitate filtered off, washed with water and dried. Recrystallization from acetone-hexane afforded 16α-carbamyl-Δ⁵-pregnen-3β-ol-20-one propionate.

When applying the same procedure to 16α-carbamyl-allopregnan-3β-ol-20-one, there was obtained 16α-carbamyl-allopregnan-3β-ol-20-one, propionate.

EXAMPLE XVIII 3.5 g. of 16β-carboxy-Δ⁵-17α-pregnen-3β-ol-20-one (Mazur et al. V. supra) were dissolved in 25 cc. of pyridine and 10 cc. of acetic anhydride were added. The mixture was heated on the steam bath for 5 hours, then left overnight at room temperature. There was added dilute hydrochloric acid and the product was extracted with ethyl acetate. The extract was washed with water to neutral, dried over anhydrous sodium sulfate and evaporated to dryness. Recrystallization afforded the 3-acetate of the Δ⁵,²⁰-17α-pregnadiene-3β-20-diol-16α-carboxylic acid lactone.

EXAMPLE XIX

To a solution of 1 g. of the latter lactone in 300 cc. of dioxane were added 700 mg. of potassium bicarbonate dissolved in 50 cc. of water. The resulting mixture was refluxed for 2 hours, then acidified with dilute hydrochloric acid and extracted with methylene chloride. The extract was washed with water, dried over sodium sulfate and evaporated to dryness. Recrystallization from methanol-water yielded the acetate of Δ⁵-17α-pregnen-3β-ol-20-one-16α-carboxylic acid.

EXAMPLE XX

The latter 16α-carboxylic acid was treated successively in accordance with Examples V, I, and II, yielding respectively: Δ⁵-17α-pregnen-3β-ol-20-one-16α-carboxylic acid, methyl ester and Δ⁴-17α-pregnene-3,20-dione-16α-carboxylic acid methyl ester.

EXAMPLE XXI

The latter methyl ester was hydrolyzed in accordance with Example V, thus giving: Δ⁴-17α-pregnene-3,20-dione-16α-carboxylic acid.

EXAMPLE XXII

The acetate of Δ⁵-17α-pregnen-3β-ol-20-one 16α-carboxylic acid was treated in accordance with Examples VII, VIII, IX, X, XI and XII thus giving respectively:

16α-(diethyl carbamyl)-Δ⁵-17α-pregnen-3β-ol-20-one acetate,
16α-(piperidino carbonyl)-Δ⁵-17α-pregnen-3β-ol-20-one acetate,
16α-(morpholino carbonyl)-Δ⁵-17α-pregnen-3β-ol-20-one acetate,
16α-carbamyl-Δ⁵-17α-pregnen-3β-ol-20-one acetate,
16α-(N',N'-diethylaminoethyl carbamyl)-Δ⁵-17α-pregnen-3β-ol-20-one acetate, and
16α-(N-methyl-N-phenyl carbamyl)-Δ⁵-17α-pregnen-3β-ol-20-one acetate.

EXAMPLE XXIII

16α - (diethyl carbamyl)-Δ⁵-17α-pregnen-3β-ol-20-one acetate was treated in accordance with Example XIII, thus furnishing 16α-(diethyl carbamyl)-Δ⁵-17α-pregnen-3β-ol-20-one.

The rest of the compounds disclosed in Example XXII were saponified by the same procedure, thus affording the corresponding free alcohols.

EXAMPLE XXIV

The final products of Example XXII were treated in accordance with Example XV, thus yielding respectively: 16α-(diethyl carbamyl)-17α-allopregnan-3β-ol-20-one acetate, 16α-(piperidino carbonyl)-17α-allopregnan-3β-ol-20-one acetate, 16α-(morpholino carbonyl)-17α-allopregnan-3β-ol-20-one acetate, 16α-carbamyl 17α-allopregnan-3β-ol-20-one acetate, 16α-(N',N'-diethylaminoethyl carbamyl)-17α-allopregnan-3β-ol-20-one acetate, and 16α-(N-methyl-N-phenyl carbamyl)-17α-allopregnan-3β-ol-20-one acetate.

EXAMPLE XXV

Δ⁴-17α-pregnene-3,20-dione-16α-carboxylic acid was treated in accordance with Example XIV, thus furnishing: 16α - carbamyl-Δ⁴-17α-pregnene-3,20-dione, 16α-(diethyl carbamyl)-Δ⁴-17α-pregnene-3,20-dione, 16α-(piperidino carbonyl)-Δ⁴-17α-pregnene-3,20-dione, 16α-(morpholino carbonyl)-Δ⁴-17α-pregnene-3,20-dione, 16α-(N',N'-diethylaminoethyl carbamyl)-Δ⁴-17α-pregnene-3,20-dione, and 16α-(N-methyl-N-phenyl carbamyl)-Δ⁴-17α-pregnene-3,20-dione.

EXAMPLE XXVI

The compounds obtained in Example XXV were treated according to Example XV, thus giving respectively: 16α-carbamyl 17α-allopregnane-3,20-dione, 16α-(diethyl carbamyl)-17α-allopregnane-3,20-dione, 16α-(piperidino carbonyl)-17α-allopregnane-3,20-dione, 16α-(morpholino carbonyl)-17α-allopregnane-3,20-dione, 16α-(N',N'-diethylaminoethyl carbamyl)-17α-allopregnane-3,20-dione, and 16α-(N-methyl-N-phenyl carbamyl)-17α-allopregnane-3,20-dione.

EXAMPLE XXVII

16α-carbamyl-17α-allopregnan-3β-ol-20-one acetate was treated successively according to Examples XIII and XVII thus giving respectively 16α-carbamyl-17α-allopregnan-3β-ol-20-one and 16α-carbamyl-17α-allopregnan-3β-ol-20-one propionate.

EXAMPLE XXVIII 1 g. of Δ⁵-17α-pregnen-3β-ol-20-one-16β-carboxylic acid 3-acetate (M.P. 208–210°; [α]$_D$ —95° (CHCl₃)), prepared by conventional acetylation with acetic anhydride in the presence of pyridine of Δ⁵-17α-pregnen-3β-ol-20-one-16β- carboxylic acid (Romo, Tetrahedron, 3, 37, 1958) was dissolved in 50 cc. of benzene and treated with 2 g. of thionyl chloride.

The mixture was refluxed under anhydrous conditions for 2 hours. The solvent was evaporated under reduced pressure, the residue was again dissolved in 20 cc. of benzene and the solution evaporated to dryness, to make certain the total absence of thionyl chloride. The crude 16β-carboxylic acid chloride was treated with 2 cc. of diethylamine in 50 cc. of benzene. The reaction mixture was left overnight at room temperature, then an aqueous solution of sodium carbonate was added. The resulting emulsion was extracted with ether, the extract dried over sodium sulfate and evaporated to dryness. Crystallization from methanol-water afforded 16β-(diethyl carbamyl)-Δ⁵-17α-pregnen-3β-ol-20-one 3-acetate. M.P. 134–136° C.; [α]$_D$ —66° (CHCl₃).

EXAMPLE XXIX 1 g. of Δ⁵-pregnen-3β-ol-20-one-16β-carboxylic acid 3-acetate was treated following the technique described in Example XXVIII, except that diethylamine was substituted by piperidine thus affording 16β-(1-piperidyl-carbonyl)-Δ⁵-17α-pregnen-3β-ol-20-one 3-acetate.

EXAMPLE XXX 1 g. of Δ⁵-17α-pregnen-3β-ol-20-one-16β-carboxylic acid 3-acetate was treated in accordance with the method described in Example XXVIII except that diethylamine was substituted by morpholine thus furnishing 16β-(4-morpholino carbonyl)-Δ⁵-17α-pregnen-3β-ol-20-one 3-acetate.

EXAMPLE XXXI 1 g. of Δ⁵-17α-pregnen-3β-ol-20-one-16β-carboxylic acid 3-acetate was treated with thionyl chloride in accordance with Example XXVIII. The 16β-carboxylic acid chloride thus obtained was dissolved in 50 cc. of benzene and 5 cc. of ammonium hydroxide were added. The formed precipitate was filtered off, washed with benzene and dried under vacuum. Recrystallization from methanol-water afforded 16β-carbamyl-Δ⁵-17α-pregnen-3β-ol-20-one 3-acetate. M.P. 210–212° C.; [α]$_D$ —110° (CHCl₃).

EXAMPLE XXXII

A solution of 1 g. of the acetate of Δ⁵-17α-pregnen-3β-ol-20-one-16β-carboxylic acid chloride in 50 cc. of benzene was treated with 5 cc. of N,N-diethylaminoethyl amine and the reaction mixture was left for 60 hours at room temperature. After the usual isolation technique there was obtained 16β-(N',N'-diethylaminoethyl carbamyl)-Δ⁵-17α-pregnen-3β-ol-20-one 3-acetate. The methiodide, prepared by treatment of the amide with methyl iodide showed M.P. 204–206° C.; [α]$_D$ —103° (MeOH).

In another experiment there were used 15 cc. of N,N-diethylaminoethyl amine for 1 g. of the acid chloride and the reaction mixture was kept at room temperature for 8 days. There was thus obtained 16β-(N',N'-diethylaminoethyl carbamyl)-Δ⁵-17β-pregnen-3β-ol-20-one 3-acetate, which upon treatment with methyl iodide gave the corresponding methiodide which has a M.P. 263–266° C.; [α]$_D$ +156° (MeOH).

EXAMPLE XXXIII

To a solution of 100 mg. of 16β-(N',N'-diethylaminoethyl carbamyl)-Δ⁵-17α-pregnen-3β-ol-20-one 3-acetate in 15 cc. of methanol there were added 3 drops of a 2% methanol solution of sodium hydroxide and the mixture kept at room temperature for 48 hours. It was then diluted with water, extracted with ethyl acetate and the organic extract washed to neutral, dried and evaporated to dryness. The residue was reacetylated with acetic anhydride in pyridine solution; there was thus obtained 16β-(N',N-diethylaminoethyl carbamyl)-Δ⁵-pregnen-3β-ol-20-one 3-acetate, identical to that obtained in the preceding example by using an excess of amine.

EXAMPLE XXXIV 1 g. of Δ⁵-17α-pregnen-3β-ol-20-one-16β-carboxylic acid 3-acetate was treated in accordance with Example XXVIII but diethylamine was substituted by N-methyl aniline thus yielding 16β-(N-methyl-N-phenyl carbamyl)-Δ⁵-17α-pregnen-3β-ol-20-one 3-acetate.

Treatment of this compound with 3 drops of 2% methanolic solution of sodium hydroxide, in accordance with the method of the preceding example, gave the corresponding 17β-isomer.

EXAMPLE XXXV 3 g. of 16β-carbamyl-Δ⁵-17α-pregnen-3β-ol-20-one 3-acetate obtained according to Example XXXI in 100 cc. of methanol were treated with 1 g. of potassium carbonate in 5 cc. of water. The mixture was refluxed for 0.5 hour, then poured into ice water, the precipitate collected, washed with water, and dried, thus producing a crude product which upon recrystallization from methylene chloride-ether afforded 16β-carbamyl-Δ⁵-17α-pregnen-3β-ol-20-one.

When applying the above method to 16β-(diethylcarbamyl)-Δ⁵-17α-pregnen-3β-ol-20-one 3-acetate, 16β-(1-piperidyl carbonyl)-$\Delta^5$-17α-pregnen-3β-ol-20-one 3-acetate, 16β - (4 - morpholino carbonyl) - $\Delta^5$ - 17α - pregnen - 3β-ol-20-one 3-acetate, 16β-(N',N'-diethylaminoethyl carbamyl)-$\Delta^5$-17α-pregnen-3β-ol-20-one 3-acetate, and 16β-(N-methyl-N-phenyl carbamyl)-$\Delta^5$-17α-pregnen-3β-ol-20-one 3-acetate, there were correspondingly obtained: 16β-(diethyl carbamyl)-$\Delta^5$-17α-pregnen-3β-ol-20-one, 16β-(1-piperidyl carbonyl)-$\Delta^5$-17α-pregnen-3β-ol-20-one, 16β-(4-morpholino carbonyl)-$\Delta^5$-17α-pregnen-3β-ol-20-one, 16β-(N',N'-diethylaminoethyl carbamyl)-$\Delta^5$-17α-pregnen-3β-ol - 20 - one, and 16β - (N - methyl - N - phenyl carbamyl)-$\Delta^5$-17α-pregnen-3β-ol-20-one.

EXAMPLE XXXVI

To a solution of 2.4 g. of 16β-carboxy-$\Delta^4$-17α-pregnen-3,20-dione in 360 cc. of ethyl alcohol, 67.5 cc. of 0.1 N sodium hydroxide solution were added. This mixture was evaporated to dryness under high vacuum and then dried, under high vacuum, at 110° during 1 hour. Then 50 cc. of anhydrous benzene and 25 drops of anhydrous pyridine were added, at room temperature. After cooling this solution at 0°, 10 cc. of oxalyl chloride were added with stirring. The mixture was allowed to react during 3 hours at 0°. The solvents were then evacuated under high vacuum. To this dry material 60 cc. of anhydrous benzene were added and then, drop by drop, at 0°, 80 cc. of ammonium hydroxide were added with stirring. This mixture was allowed to react for 3 hours at 0° and 15 hours at room temperature. Extraction with ethyl acetate followed by a chromatography on silica gel gave, by elution with a mixture of chloroform-methanol (80–20), the expected amide which was recrystallized from methanol-water to give 16β-carbamyl-$\Delta^4$-17α-pregnen-3,20-dione. M.P. 259–261° C.; $[\alpha]_D +12°$ (CHCl$_3$), $\lambda_{max}^{EtOH}$ 240 m$\mu$; log $\epsilon$ 4.22.

When using the same technique with different amines there were correspondingly formed 16β-diethyl carbamyl-$\Delta^4$-17α-pregnene-3,20-dione, 16β-(1-piperidyl carbonyl)-$\Delta^4$-17α-pregnene-3,20-dione, 16β-(4-morpholino carbonyl) - $\Delta^4$ - 17α - pregnene - 3,20 - dione, 16β - (N',N' - diethylaminoethyl carbamyl)-$\Delta^4$-17α-pregnene-3,20-dione, and 16β - (N - methyl - N - phenyl carbamyl) - $\Delta^4$ - 17α-pregnene-3,20-dione.

Further treatment of these compounds with 2% methanolic potassium hydroxide, as described in Example XXXIII, gave the corresponding 17β-isomers.

EXAMPLE XXXVII

A solution of 800 mg. of 16β-carbamyl-$\Delta^4$-17α-pregnen-3,20-dione in 40 cc. of ethyl acetate was shaken with 50 mg. of 5% palladium charcoal catalyst in a hydrogen atmosphere, until the gas uptake corresponded to one mol. The catalyst was filtered off and the filtrate evaporated to dryness. Recrystallization from methanol afforded 16β-carbamyl-17α-allopregnane-3,20-dione.

Following the same technique there were hydrogenated 16β-diethyl carbamyl-$\Delta^4$-17α-pregnene-3,20-dione, 16β-(1-piperidylcarbonyl) - $\Delta^4$ - 17α - pregnene - 3,20 - dione, 16β-(4 - morpholino carbonyl) - $\Delta^4$ - 17α - pregnene - 3,20 - dione, 16β-(N',N'-diethylaminoethyl carbamyl)-$\Delta^4$-pregnene-3,20-dione, and 16β-(N-methyl-N-phenyl carbamyl)-$\Delta^4$-pregnene-3,20-dione giving respectively 16β-diethyl carbamyl-17α-allopregnane-3,20-dione, 16β-(1-piperidyl carbonyl-17α-allopregnan-3,20-dione, 16β-(1-morpholino carbonyl)-17α-allopregnane, 3,20-dione, 16β-(N',N'-diethylaminoethyl carbamyl)-allopregnane-3,20-dione, and 16β-(N-methyl-N-phenyl carbamyl)-allopregnane-3,20-dione.

EXAMPLE XXXVIII

Following the technique delineated in Example XXXVII, there were hydrogenated 800 mg. of 16β-carbamyl-$\Delta^5$-17α-pregnen-3β-ol-20-one to give 16β-carbamyl-17α-allopregnan-3β-ol-20-one.

By the same method were treated 16β-diethyl carbamyl-$\Delta^5$-17α-pregnen-3β-ol-20-one. 16β-(1-piperidyl carbonyl)-$\Delta^5$-17α-pregnen-3β-ol-20-one, 16β-(4-morpholino-carbonyl) - $\Delta^5$ - 17α - pregnen - 3β - ol - 20 - one, 16β - (N',N'-diethylaminoethyl carbamyl) - $\Delta^5$ - 17α - pregnen - 3β - ol-20-one, and 16β-(N-methyl-N-phenyl carbamyl)-$\Delta^5$-17α-pregnen-3β-ol-20-one, furnishing correspondingly 16β-diethyl carbamyl-17α-allopregnan-3β-ol-20-one, 16β-(1-piperidyl carbonyl-17α-allopregnan-3β-ol-20-one, 16β-(4-morpholino carbonyl)-17α-allopregnan-3β-ol-20-one, 16β-(N',N'-diethylaminoethyl carbamyl)-17α-allopregnan-3β-ol-20-one, and 16β-(N-methyl-N-phenyl carbamyl)-17α-allopregnan-3β-ol-20-one.

EXAMPLE XXXIX 500 mg. of 16β-carbamyl-$\Delta^5$-17α-pregnen-3β-ol-20-one in 5 cc. of pyridine were treated with 1 cc. of propionic anhydride. The reaction mixture was left overnight at room temperature, then poured into ice water, the formed precipitate filtered off, washed with water and dried. Recrystallization from acetone-hexane afforded 16β-carbamyl-$\Delta^5$-17α-pregnen-3β-ol-20-one 3-propionate.

Following the above technique, there were treated the starting materials listed below with the acylating agent indicated, furnishing the corresponding products hereinafter set forth:

| Starting Compound | Acylating agent | Products |
| --- | --- | --- |
| 16β-diethyl carbamyl-$\Delta^5$-17α-pregnen-3β-ol-20-one | Benzoyl chloride | 3-benzoate of 16β-diethyl carbamyl-$\Delta^5$-17α-pregnen-3β-ol-20-one. |
| Do | Caproic anhydride | 3-caproate of 16β-diethyl carbamyl-$\Delta^5$-17α-pregnen-3β-ol-20-one. |
| 16β-(1-piperidyl carbonyl)-$\Delta^5$-17α-pregnen-3β-ol-20-one | Cyclopentylpropionic anhydride | 3-cyclopentylpropionate of 16β-(1-piperidyl carbonyl)-$\Delta^5$-17α-pregnen-3β-ol-20-one. |
| Do | Propionic anhydride | 3-propionate of 16β-(1-piperidyl carbonyl)-$\Delta^5$-17α-pregnen-3β-ol-20-one. |
| 16β-(4-morpholino carbonyl)-$\Delta^5$-17α-pregnen-3β-ol-20-one | Caproic anhydride | 3-caproate of 16β-(4-morpholino carbonyl)-$\Delta^5$-17α-pregnen-3β-ol-20-one. |
| Do | Propionic anhydride | 3-propionate of 16β-(4-morpholino carbonyl)-$\Delta^5$-17α-pregnen-3β-ol-20-one. |
| 16β-(N,N'-diethylaminoethyl carbamyl)-17α-allopregnan-3β-ol-20-one | Benzoyl chloride | 3-benzoate of 16β-(N',N'-diethylaminoethyl carbamyl)-17α-allopregnan-3β-ol-20-one. |
| Do | Cyclopentylpropionic anhydride | 3-cyclopentylpropionate of 16β-(N',N'diethylaminoethyl carbamyl)-17α-allopregnan-3β-ol-20-one. |
| 16β-(N-methyl-N-phenyl carbamyl)-17α-allopregnan-3β-ol-20-one | Propionic anhydride | 3-propionate of 16β-(N-methyl-N-phenyl carbamyl)-17α-allopregnan-3β-ol-20-one. |
| Do | Benzoyl chloride | 3-benzoate of 16β-(N-methyl-N-phenyl carbamyl)-17α-allopregnan-3β-ol-20-one. |
| 16β-diethyl carbamyl 17α-allopregnan-3β-ol-20-one | Caproic anhydride | 3-caproate of 16β-diethyl carbamyl-17α-allopregnan-3β-ol-20-one. |
| Do | Cyclopentylpropionic anhydride | 3-cyclopentylpropionate of 16β-diethyl carbamyl-17α-allopregnan-3β-ol-20-one. |
| 16β-(1-piperidyl carbonyl)-17α-allopregnan-3β-ol-20-one | Propionic anhydride | 3-propionate of 16β-(1-piperidyl carbonyl)-17α-allopregnan-3β-ol-20-one. |
| Do | Caproic anhydride | 3-caproate of 16β-(1-piperidyl carbonyl)-17α-allopregnan-3β-ol-20-one. |

EXAMPLE XL

By substituting in the method of Example XXVIII the diethylamine by pyrrolidine, piperazine, 4-methyl piperazine, 3-methyl piperidine, there were obtained the corresponding 16β-(1-pyrrolidyl carbonyl), 16β-(1-piperazyl carbonyl), 16β-[1-(4-methyl)-piperazyl carbonyl], 16β-[1-(3-methyl)-piperidyl carbonyl] derivatives of Δ$^5$-17α-pregnen-3β-ol-20-one-3-acetate which upon treatment in accordance with the method of Example XXXIV were converted in the free 3β-ol derivatives.

I claim:

1. A compound of the following formula:

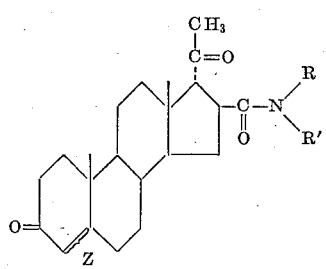

wherein Z is a member of the group consisting of a double bond and a saturated linkage between C-4 and C-5; R and R$^1$ are selected from the group consisting of hydrogen, a lower alkyl, an amino lower alkyl, a lower alkylamino lower alkyl, a dilower alkylamino lower alkyl, an aryl and an aralkyl group containing up to 8 carbon atoms and R and R$^1$ together with the nitrogen atom form a heterocyclic radical selected from the group consisting of piperidino, morpholino, pyrrolidino and piperazino.

2. A compound of the following formula:

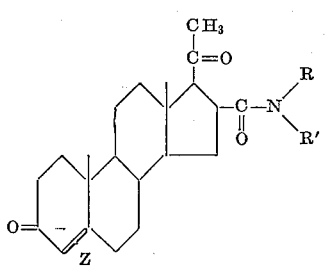

wherein Z is a member of the group consisting of a double bond and a saturated linkage between C-4 and C-5; R and R$^1$ are selected from the group consisting of hydrogen, a lower alkyl, an amino lower alkyl, a lower alkylamino lower alkyl, a dilower alkylamino lower alkyl, an aryl and an aralkyl group containing up to 8 carbon atoms and R and R$^1$ together with the nitrogen atom form a heterocyclic radical selected from the group consisting of piperidino, morpholino, pyrrolidino and piperazino.

3. 16β-carbamyl-Δ$^4$-17α-pregnene-3,20-dione.

4. A compound of the following formula:

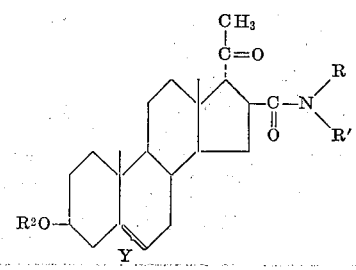

wherein Y is a member of the group consisting of a double bond and a saturated linkage between C-5 and C-6; R and R$^1$ are selected from the group consisting of hydrogen, a lower alkyl, an amino lower alkyl, a lower alkylamino lower alkyl, a diloweralkylamino lower alkyl, an aryl and an aralkyl group containing up to 8 carbon atoms and R and R$^1$ together with the nitrogen form a heterocyclic radical selected from the group consisting of piperidino, morpholino, pyrrolidino, and piperazino; R$^2$ is selected from the group consisting of hydrogen and a hydrocarbon carboxylic acyl group of less than 12 carbon atoms.

5. A compound of the following formula:

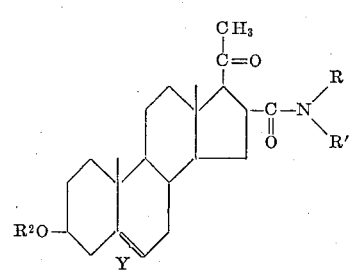

wherein Y is a member of the group consisting of a double bond and a saturated linkage between C-5 and C-6; R and R$^1$ are selected from the group consisting of hydrogen, a lower alkyl, an amino lower alkyl, a lower alkylamino lower alkyl, a diloweralkylamino lower alkyl, an aryl and an aralkyl group containing up to 8 carbon atoms and R and R$^1$ together with the nitrogen form a heterocyclic radical selected from the group consisting of piperidino, morpholino, pyrrolidino, and piperazino; R$^2$ is selected from the group consisting of hydrogen and a hydrocarbon carboxylic acyl group of less than 12 carbon atoms.

6. 16β-diethyl carbamyl-Δ$^5$-17α-pregnen-3β-ol-20-one 3-acetate.

7. 16β - (N′,N′ - diethylaminoethyl-carbamyl)-Δ$^5$-17α-pregnen-3β-ol-20-one-3-acetate.

8. 16β-carbamyl-Δ$^5$-17α-pregnen-3β-ol-20-one 3-acetate.

9. 16β - (N,N′ - diethylaminoethyl - carbamyl)-Δ$^5$-17β-pregnen-3β-ol-20-one 3-acetate.

10. A compound of the following formula:

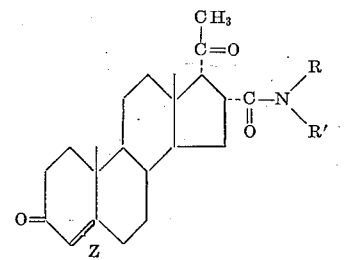

wherein Z is a member of the group consisting of a double bond and a saturated linkage between C-4 and C-5; R and R$^1$ are selected from the group consisting of hydrogen, a lower alkyl, an amino lower alkyl, a lower alkylamino lower alkyl, a dilower alkylamino lower alkyl, an aryl and an aralkyl group containing up to 8 carbon atoms and R and R$^1$ together with the nitrogen atom form a heterocyclic radical selected from the group consisting of piperidino, morpholino, pyrrolidino and piperazino.

11. A compound of the following formula:

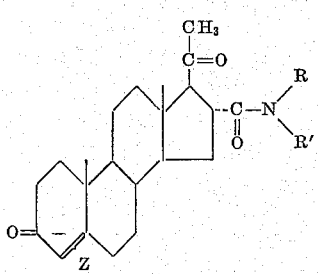

wherein Z is a member of the group consisting of a double bond and a saturated linkage between C–4 and C–5; R and $R^1$ are selected from the group consisting of hydrogen, a lower alkyl, an amino lower alkyl, a lower alkylamino lower alkyl, a dilower alkylamino lower alkyl, an aryl and an aralkyl group containing up to 8 carbon atoms and R and $R^1$ together with the nitrogen atom form a heterocyclic radical selected from the group consisting of piperidino, morpholino, pyrrolidino and piperazino.

12. A compound of the following formula:

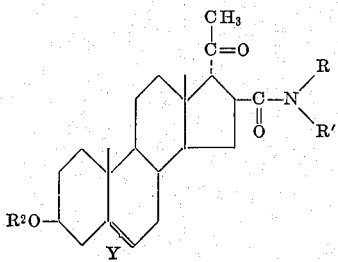

wherein Y is a member of the group consisting of a double bond and a saturated linkage between C–5 and C–6; R and $R^1$ are selected from the group consisting of hydrogen, a lower alkyl, an amino lower alkyl, lower alkylamino lower alkyl, a diloweralkylamino lower alkyl, an aryl and an aralkyl group containing up to 8 carbon atoms and R and $R^1$ together with the nitrogen form a heterocyclic radical selected from the group consisting of piperidino, morpholino, pyrrolidino, and piperazino; $R^2$ is selected from the group consisting of hydrogen, and a hydrocarbon carboxylic acyl group of less than 12 carbon atoms.

13. A compound of the following formula:

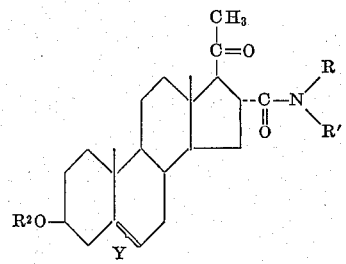

wherein Y is a member of the group consisting of a double bond and a saturated linkage between C–5 and C–6; R and $R^1$ are selected from the group consisting of hydrogen, a lower alkyl, an amino lower alkyl, a lower alkylamino lower alkyl, a diloweralkylamino lower alkyl, an aryl and an aralkyl group containing up to 8 carbon atoms, and R and $R^1$ together with the nitrogen form a heterocyclic radical selected from the group consisting of piperidino, morpholino, pyrrolidino, and piperazino; $R^2$ is selected from the group consisting of hydrogen and a hydrocarbon carboxylic acyl group of less than 12 carbon atoms.

14. 16α-carbamyl-$\Delta^5$-pregnen-3β-ol-20-one.
15. 16α - (N',N'-diethylaminoethyl-carbamyl)-$\Delta^5$-pregnen-3β-ol-20-one.
16. 16α-carbamyl-$\Delta^4$-pregnene-3,20-dione.
17. 16α-(diethyl-carbamyl)-$\Delta^4$-pregnene-3,20-dione.
18. 16α-(piperidino-carbonyl)-$\Delta^4$-pregnene-3,20-dione.
19. 16α-carbamyl-$\Delta^5$-17α-pregnen-3β-ol-20-one acetate.
20. 16α-carbamyl-$\Delta^4$-17α-pregnene-3,20-dione.

References Cited by the Examiner
UNITED STATES PATENTS
3,066,136   11/1962   Crabbe _____ 260—239.5

OTHER REFERENCES
Fieser and Fieser, "Steroids," 1959, page 566, Reinhold Pub. Corp., New York.

LEWIS GOTTS, *Primary Examiner.*